April 16, 1957
A. R. GRAHAM
2,789,142
PRODUCTION OF RESORCINOL FROM
META-DIISOPROPYLBENZENE
DIHYDROPEROXIDE
Filed Sept. 22, 1955
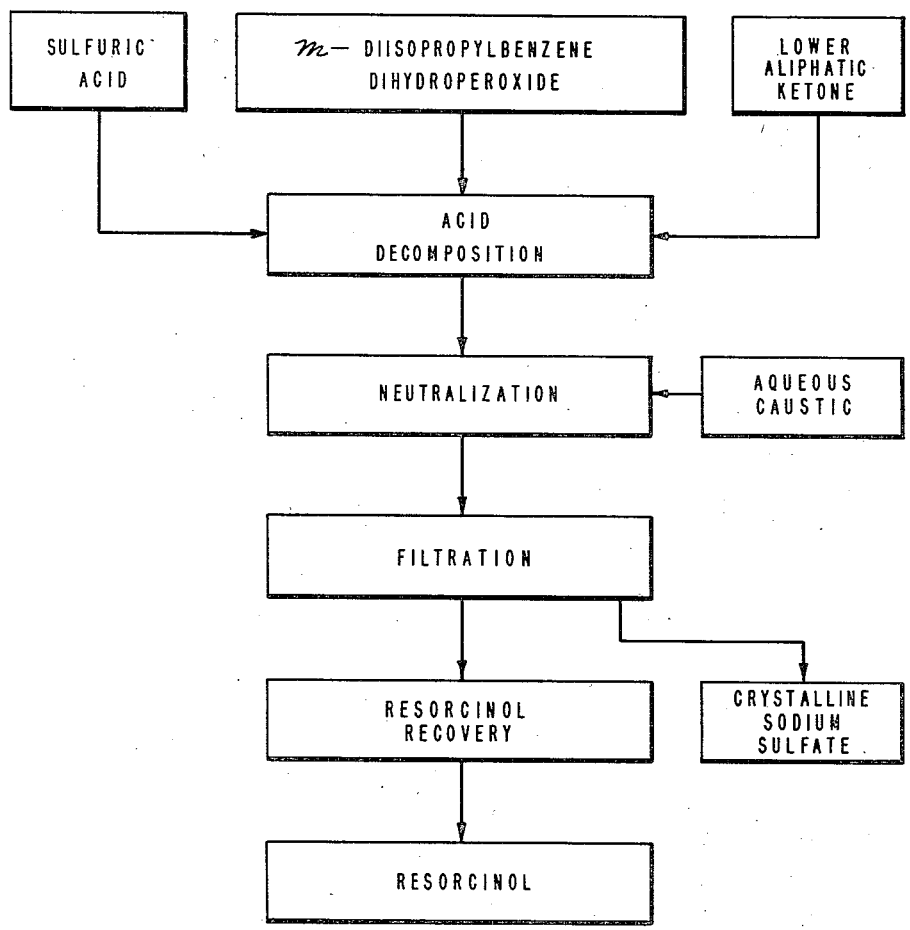
ARCHIBALD ROBERT GRAHAM
INVENTOR.
BY
AGENT.

2,789,142

Patented Apr. 16, 1957

2,789,142

PRODUCTION OF RESORCINOL FROM META-DIISOPROPYLBENZENE DIHYDROPEROXIDE

Archibald Robert Graham, Richmond, England, assignor, by mesne assignments, to Hercules Powder Company, a corporation of Delaware Application September 22, 1955, Serial No. 536,043

Claims priority, application Great Britain September 29, 1954

4 Claims. (Cl. 260—621)

The present invention relates to the production of phenols and especially to the recovery and isolation of dihydric phenols prepared by the catalytic decomposition of di-alkylaryl methyl hydroperoxides.

The production of phenols by acid-catalysed decomposition of aralkyl hydroperoxides has already been described. In one process isopropylbenzene hydroperoxide is decomposed in solution in a mixture of acetone and isopropylbenzene using sulphuric acid as catalyst. The resulting decomposition product contains phenol and sulphuric acid in solution in acetone and isopropylbenzene, and is immediately neutralised with aqueous sodium hydroxide or sodium phenate to a pH of about 7 or above. The phenol may then be recovered by fractional distillation. The neutralisation serves a number of useful purposes, including the avoidance of conditions under which condensation reactions of the phenol may subsequently occur, and results in the precipitation of sodium sulphate which may be filtered off. However, when the analogous decomposition product from meta-diisopropylbenzene dihydroperoxide containing resorcinol is neutralised in this way, instead of an inorganic precipitate a dark viscous liquid phase is thrown out, containing some of the resorcinol in a combined state which cannot readily be recovered by extraction with solvents or by distillation and which therefore represents a loss. Furthermore, the tarry precipitate obtained in this way tends to block up filters and thereby hinders the recovery of the free resorcinol.

It is an object of the present invention to provide a process which avoids these diffculties and leads to the formation of a crystalline filterable alkali metal sulphate and higher recoveries of resorcinol.

Accordingly, the present invention, as shown in the accompanying drawing, comprises, in the process for the production of resorcinol by the decomposition of meta-diisopropylbenzene dihydroperoxide in a ketonic solvent, in the presence of sulphuric acid to give an acid decomposition reaction product from which the resorcinol is recovered, the step of treating the reaction product with an aqueous alkali metal hydroxide solution to give a pH value in the range of 2.5 to 4. The so-treated reaction product may be separated from the precipitated sodium sulphate by filtration or decantation.

The pH value of the reaction product is measured by shaking a sample of the product, after filtration, with an equal volume of distilled water and determining the pH of the lower aqueous layer. If no lower layer forms, for instance where the cleavage was carried out in 100% acetone, the pH is determined on the whole sample after addition of the water.

At pH values above about 4 the precipitate of alkali metal sulphate is brown and tarry and is difficult to filter, the filter tending to block up. Below this pH value the precipitate is fine, white, crystalline and is easily filtered. At pH values below about 2.5, the precipitate is still filterable but the yield of resorcinol may fall as a result of the acid conditions and corrosion of the plant may take place.

Any alkali metal hydroxide may be used in the neutralisation step, but the use of sodium hydroxide is preferred. The concentration of the aqueous alkali metal hydroxide solution is not critical and concentrations between about 1 and 50% are suitable. The preferred concentration range is about 4% to 20%.

The amount of alkali which should be added to bring the pH of the decomposition reaction product within the range required may be readily determined by experiment on a small sample of the reaction product.

The ketonic solvent is suitably a lower aliphatic ketone. Preferred solvents are lower aliphatic ketones having between three and six carbon atoms such as acetone, or mixtures of acetone with methyl isobutyl ketone, or methyl ethyl ketone.

The alkali treatment according to the process of the present invention may be carried out continuously or in a batchwise manner. The decomposition reaction product is preferably well agitated during and after the addition of the alkali to ensure complete precipitation of the alkali metal sulphate. In one method of batchwise operation the required amount of 4% aqueous sodium hydroxide is slowly added to the decomposition reaction product in a vessel equipped with stirrers. The reaction product is well stirred during and for about one hour after the addition of the alkali. The mixture is then filtered and treated for the recovery of the resorcinol by methods known in the art, such as by distillation, preferably in the presence of an azeotroping agent for the resorcinol.

In a preferred method of continuous operation, the decomposition reaction product is continuously fed to a stirred vessel fitted with an overflow, concurrently with the necessary amount of 4% aqueous sodium hydroxide to give the pH of 2.5–4. The treated product continuously overflows and is filtered and treated for the recovery of the resorcinol by methods known in the art, such as by distillation, preferably in the presence of an azeotroping agent for the resorcinol.

The following comparative examples illustrate the advantages achieved by the process of the present invention. In the examples, the parts by weight and parts by volume bear the same relation to each other as do kilograms to litres.

Example 1

An apparatus for the decomposition of meta-diisopropylbenzene dihydroperoxide consisted of a vessel fitted with stirrer and reflux condenser and a heated holding coil. The product from the vessel overflowed into the holding coil, through which it passed and was then cooled and collected.

Equal volumes of solutions containing (a) 15–55% w./v. meta-diisopropylbenzene dihydroperoxide in methyl isobutyl ketone and (b) 0.10–1.0% w./v. sulphuric acid in acetone were fed to the apparatus so that the total residence time in the vessel and holding coil was 6–8 minutes. The contents of the vessel were kept at the boiling point of the reaction mixture and those of the holding coil 3 to 5° C. below the boiling point.

When conditions were steady samples of the product were collected and stirred with varying amounts of 4% aqueous sodium hydroxide solution, for 1 hour, and were then filtered. The pH was then determined by shaking a portion of the filtered product with an equal volume of distilled water, and measuring the pH of the lower aqueous layer. The resorcinol was recovered from the filtered product by methods known in the art. The results are shown in Table 1.

TABLE 1

| Run No. | Solvent | Percent H₂SO₄ (w./v.) in cleavage mixture | Amount of NaOH added (Percent of theory) | pH of filtered product | Appearance of Na₂SO₄* | Yield of resorcinol (Percent of theory) |
|---|---|---|---|---|---|---|
| 1A | Methyl isobutyl ketone/acetone | 0.10 | 90 | 3.4 | Crystalline | 91.7 |
| 1B | | 0.10 | 101 | 5.5 | Tarry | 90.6 |
| 1C | | 0.10 | 110 | 6.0 | ---do--- | 85.9 |
| 2A | Methyl isobutyl ketone/acetone | 0.10 | 60 | 2.8 | Crystalline | 86.1 |
| 2B | | 0.10 | 80 | 3.3 | ---do--- | 85.3 |
| 2C | | 0.10 | 90 | 3.4 | ---do--- | 85.9 |
| 2D | | 0.10 | 90 | 3.3 | ---do--- | 87.3 |
| 2E | | 0.10 | 100 | 4.1 | Tarry | 84.2 |
| 2F | | 0.10 | 110 | 5.0 | ---do--- | 82.1 |

*Crystalline=fine, white, crystalline easily filtered precipitate. Tarry=brown to black sticky solid, tending to block up filter.

It can be seen from these results that the addition of alkali to a pH value in excess of 4 causes the formation of a tarry precipitate, while at pH values below this the precipitate is crystalline and easily handled. It can also be seen that, in any particular batch of decomposition reaction product the formation of a tarry precipitate results in a drop in the yield of resorcinol.

Example 2

A 0.2% w./v. solution of sulphuric acid in acetone was brought to the boil and an equal volume of 46.9% meta-diisopropylbenzene dihydroperoxide in methyl ethyl ketone was added at such a rate that refluxing was maintained. This required 4 to 7 minutes. The mixture was then maintained at the boil for a further 3 to 4 minutes and cooled. An amount of 1 n. aqueous sodium hydroxide equivalent to 80% of that required for complete neutralisation of the sulphuric acid present was added and the mixture was stirred for some time. Sodium sulphate separated as fine white crystals which were easily filtered off. The pH of the filtrate was 3.5 and resorcinol was recovered from this in 79.1% yield.

This process was repeated with the same reagents, but varying the degree of neutralisation. The results are shown in Table 2.

TABLE 2

| Amount of NaOH added (Percent of theory) | pH | Appearance of Na₂SO₄* | Yield of Resorcinol |
|---|---|---|---|
| Nil | 2.1 | | 70.2 |
| 50 | 2.8 | Crystalline | 79.8 |
| 80 | 3.5 | ---do--- | 79.1 |
| 100 | 5.5 | Tarry | 76.0 |
| 120 | 6.6 | ---do--- | 65.6 |

*See Table 1.

Example 3

A 0.2% weight/volume solution of sulphuric acid in acetone was brought to the boil and an equal volume of 48.4% meta-diisopropylbenzene dihydroperoxide in acetone was added at such a rate that refluxing was maintained. This required 4–7 minutes and the mixture was then maintained at the boil for a further 3–4 minutes and cooled. An amount of normal aqueous sodium hydroxide equivalent to 80% of that required for complete neutralisation of the sulphuric acid present was added and the mixture was stirred for some time. Sodium sulphate separated as fine white crystals which were easily filtered off. The pH of the filtrate was 3.65 and the resorcinol was recovered from this in 85% yield.

This process was repeated with the same reagents but varying the degree of neutralisation. The results are shown in Table 3.

TABLE 3

| Amount of NaOH added (Percent of theory) | pH | Appearance of Na₂SO₄* | Yield of Resorcinol |
|---|---|---|---|
| Nil | 2.4 | | 77 |
| 80 | 3.65 | Crystalline | 83 |
| 100 | 5.45 | Tarry | 76.5 |
| 120 | 7.9 | ---do--- | 64 |

*See Table 1.

I claim:

1. In the process for the production of resorcinol by the decomposition of meta-diisopropylbenzene dihydroperoxide in a lower aliphatic ketone solvent in the presence of sulphuric acid to give an acid decomposition reaction product from which the resorcinol is recovered, the step of neutralising the acid decomposition reaction product by addition thereto of an aqueous alkali metal hydroxide solution until said decomposition reaction product has a pH value in the range of 2.5–4, and contains crystalline alkali metal sulfate, and separating said alkali metal sulfate prior to recovering the resorcinol.

2. The process as claimed in claim 1 wherein the alkali metal hydroxide is sodium hydroxide.

3. The process as claimed in claim 1 wherein the concentration of the aqueous alkali metal hydroxide solution is in the range of about 4–20%.

4. The process as claimed in claim 1 wherein the decomposition reaction product is continuously fed to a stirred vessel fitted with an overflow concurrently with the necessary amount of aqueous sodium hydroxide to give a pH of 2.5–4 and the treated product continually overflows and is filtered and treated for the recovery of resorcinol.

References Cited in the file of this patent

UNITED STATES PATENTS

| 2,663,735 | Filar et al. | Dec. 22, 1953 |

FOREIGN PATENTS

| 485,435 | Canada | Aug. 5, 1952 |
| 293,860 | Switzerland | Jan. 4, 1954 |
| 1,096,345 | France | Jan. 26, 1955 |